(12) United States Patent
Izadian et al.

(10) Patent No.: US 11,681,038 B2
(45) Date of Patent: Jun. 20, 2023

(54) REDUCING RADAR SIGNAL INTERFERENCE BASED ON SEMI-RANDOM AND RANDOM CONFIGURATION

(71) Applicant: Woven Planet North America, Inc., Los Altos, CA (US)

(72) Inventors: Jamaledin Izadian, San Jose, CA (US); Mohammad Emadi, San Jose, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 166 days.

(21) Appl. No.: 16/721,626

(22) Filed: Dec. 19, 2019

(65) Prior Publication Data

US 2021/0190901 A1    Jun. 24, 2021

(51) Int. Cl.
*G01S 13/931* (2020.01)
*G01S 7/02* (2006.01)

(52) U.S. Cl.
CPC .......... *G01S 13/931* (2013.01); *G01S 7/0231* (2021.05); *G01S 7/0232* (2021.05); *G01S 7/0235* (2021.05)

(58) Field of Classification Search
CPC ........................................ G01S 7/023
See application file for complete search history.

(56) References Cited

U.S. PATENT DOCUMENTS

| | | | | |
|---|---|---|---|---|
| 5,280,288 A * | 1/1994 | Sherry | ................... | G01S 7/023 342/159 |
| 2002/0044082 A1 * | 4/2002 | Woodington | .......... | H01Q 13/10 342/128 |
| 2014/0097987 A1 * | 4/2014 | Worl | ................... | H01Q 3/2617 342/368 |
| 2018/0354506 A1 * | 12/2018 | Minemura | ............ | G01S 13/867 |
| 2019/0064335 A1 * | 2/2019 | Boutin | ..................... | G01S 7/023 |
| 2019/0285732 A1 | 9/2019 | Retterath | | |
| 2019/0293748 A1 | 9/2019 | Gulati | | |
| 2021/0096215 A1 * | 4/2021 | Slobodyanyuk | ........ | H04W 4/38 |
| 2021/0173077 A1 * | 6/2021 | Ford | ....................... | G01S 13/02 |
| 2021/0199759 A1 * | 7/2021 | Emadi | ........................ | G01S 7/40 |
| 2021/0199787 A1 * | 7/2021 | Emadi | .................. | G01S 13/931 |
| 2021/0288668 A1 * | 9/2021 | Xu | ........................ | H03M 13/13 |

FOREIGN PATENT DOCUMENTS

KR          20190115078 A       10/2019

OTHER PUBLICATIONS

International Search Report and Written Opinion for International Application No. PCT/US2020/066025, dated Apr. 19, 2021.

* cited by examiner

*Primary Examiner* — Marcus E Windrich
(74) *Attorney, Agent, or Firm* — Christopher G. Darrow; Darrow Mustafa PC (57) ABSTRACT

In one embodiment, a method includes identifying, for each of one or more environmental radars, one or more parameter values associated with a radar signal of the environmental radar, determining one or more transmission parameter values for the radar, wherein a combination of the one or more transmission parameter values is different from a combination of the one or more parameter values of each of the one or more environmental radars, and configuring the radar with the determined one or more transmission parameter values.

17 Claims, 8 Drawing Sheets

REDUCING RADAR SIGNAL INTERFERENCE BASED ON SEMI-RANDOM AND RANDOM CONFIGURATION

BACKGROUND

Transportation management systems and/or autonomous driving systems may need to determine a variety of information about a vehicle and the geographic area where the vehicle is operating. Such information may be important for safe operation of vehicles. For example, accurately detecting pedestrians or other vehicles surrounding a driving vehicle is essential for vehicle controls in transportation management systems and/or autonomous driving systems. Safe operation of vehicles, in turn, will not only decrease the risk of road accidents but also reduce fuel consumption significantly. Transportation management systems and/or autonomous driving systems may need to analyze complex scenarios and correctly respond to multiple potential hazard. Among others, radar (Radio Detection and Ranging) systems may provide important sensor input for safe and reliable vehicle operations because they combine high resolution in range and depth perception, with the detection of objects like pedestrians, bicycles, and other vehicles. Radar systems use radio waves for long-range object and obstacle detection, as well as for tracking the velocity and direction of the various actors such as pedestrians, other vehicles, guardrails, etc., in the environment around the vehicle. Ensuring that these radar systems operate without interference, cover the intended areas, do not fail from installation effects and provide accurate input to the control system for vehicle operations requires the usage of advanced technologies.

Radar systems rely on radars to transmit and receive signals. Based on such signals, a radar system may detect objects around a vehicle. Signals from nearby radars and other transmitters may cause signal interference to the radar system associated with the vehicle. Interference occurs when two radar signals move simultaneously through a medium. They can interfere constructively, destructively, or produce a resultant of zero. Therefore, inference of such signals may affect the overall accuracy of object detection in vehicle operations.

DESCRIPTION OF EXAMPLE EMBODIMENTS

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Transportation management systems and/or autonomous driving systems may be based on effective vehicle controls. For such purpose, the systems may communicate with a driving vehicle using radars to collect data surrounding the vehicle and then make decisions regarding the operations of the vehicle accordingly. Radars may collect data by transmitting radar signals and receiving reflective signals by surrounding objects such as pedestrians, buildings, and other vehicles. A radar signal may be associated with different parameters such as time, frequency, polarization, spatial, coding, etc. Each parameter may have its own value range. Therefore, a multi-dimensional signal space may be formed based on these parameters with their respective value ranges. The radar signal transmits in such signal space. Based on the values of the parameters, one can determine what part of signal space the radar signal is occupying.

For the purpose of vehicle operation, several radars may be installed on a vehicle to transmit and receive radar signals. In addition, many other vehicles with their own radars may be operating near each other. Under these situations, radar signals from different radars may interfere with each other if they occupy the same part of the signal space. Signal interference may negatively affect the performance of vehicle controls such as detecting objects around a vehicle. Therefore, it is important to reduce signal interference between different radars. The embodiments disclosed herein may reduce signal interference between different radars in vehicle operations by (1) randomly selecting parameters related to a radar signal for a radar, or (2) semi-randomly selecting parameters related to the radar signal for the radar based on the usage of the signal space by other radars.

Embodiments described herein have several advantages. One advantage is providing more accurate radar signals to the transportation management system and/or autonomous vehicle operation system, which may be further used for effective vehicle controls. This advantage may be attributed to the effective usage of the signal space by each radar. Another advantage is the ease and efficiency to implement as randomly or semi-randomly selecting parameters for a radar signal of a radar has low cost and is fast computationally.

Figure 1:
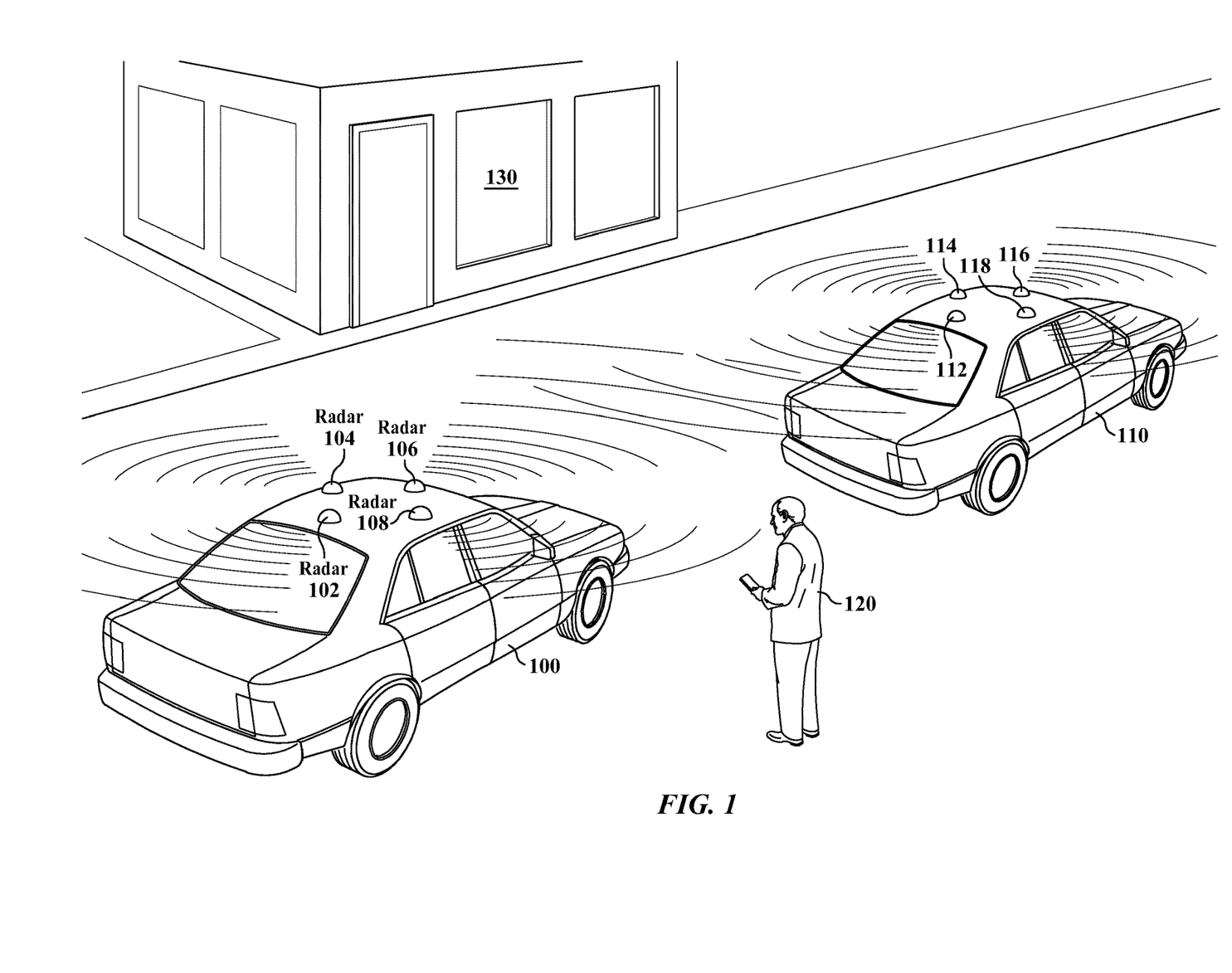
FIG. 1 illustrates an example vehicle operation facilitated by radars.

FIG. 1 illustrates an example vehicle operation facilitated by radars. As displayed in FIG. 1, a vehicle 100 is driving in the street. There are four radars, i.e., radar 102, radar 104, radar 106, and radar 108 installed on the vehicle 100. These radars may transmit and receive signals with respect to different directions and these signals reach nearby objects such as another vehicle 110, a pedestrian 120, and a building 130. The reflective signals off from these nearby objects may be further used to detect these objects. Vehicle 110 also has four radars, i.e., radar 112, radar 114, radar 116, and radar 118 installed on it. FIG. 1 also indicates that the signals from different radars may interfere with each other. For example, the signal from radar 106 on vehicle 100 may interfere with the signal from radar 112 on vehicle 110, as indicated by FIG. 1. The signal interference may negatively affect the detection accuracy of objects. Therefore, it is necessary to reduce the signal interference between different radars.

In particular embodiments, a computing system may be associated with a vehicle having a radar. As an example and not by way of limitation, the radar may be any one of the four radars on vehicle 100 as displayed in FIG. 1. As another example and not by way of limitation, the computing system may be a compact sever, a smart phone, or any other portable devices. As another example and not by way of limitation, the radar may be located on the roof of the vehicle, or the bumper of the vehicle, or any other suitable locations that can hold a radar.

Figure 2:
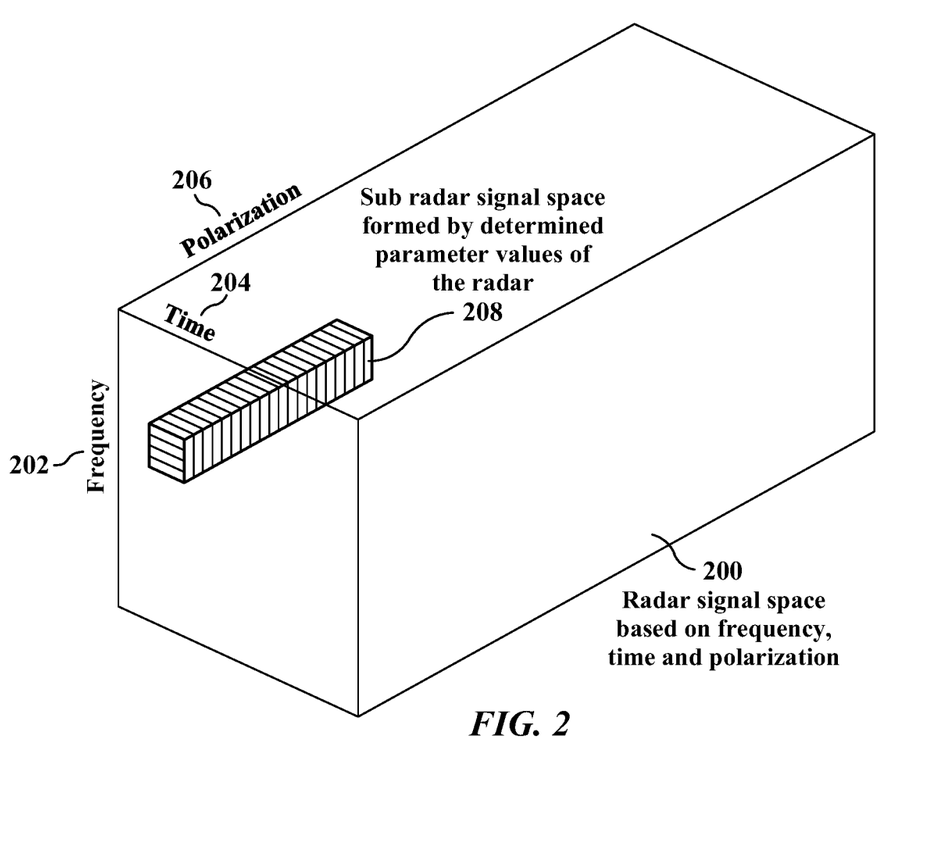
FIG. 2 illustrates an example visualization of a radar signal space based on multiple parameters.

FIG. 2 illustrates an example visualization of a radar signal space 200 based on multiple parameters. In particular embodiments, the radar may emit radar signals based on one or more transmission parameters values. The one or more transmission parameter values may correspond to one or more parameters. In particular embodiments, the one or more parameters may include at least one of time, frequency, polarization, pulse width, or pulse repetition frequency. In particular embodiments, the one or more parameters may have one or more value ranges, respectively. As an example and not by way of limitation, one of the one or more parameters may be frequency and its value range may be 76 GHz to 81 GHz. As another example and not by way of limitation, one of the one or more parameters may be time and its value range may be 10 milliseconds to 100 milliseconds. In particular embodiments, the value range for each parameter may be selected based on regulatory (e.g., assigned spectrum for frequency) and performance considerations. Based on these parameters and their respective value ranges, a radar signal space 200 may be formed virtually. As visualized in FIG. 2, three parameters, i.e., frequency 202, time 204, and polarization 206 may form a radar signal space 200. Because there are three parameters, the radar signal space 200 is three-dimensional. If there are even more parameters, the radar signal space 200 may have more dimensions, e.g., four-dimensional for four parameters. In particular embodiments, the computing system may need to determine the transmission parameter values for the radar so that the radar signal may be effectively transmitted and received for the purpose of vehicle controls. As an example and not by way of limitation, for the vehicle 100 in FIG. 1, the computing system may need to determine the transmission parameter values for radar 102 so that its signal will not interfere with the signals of radar 104, radar 106, radar 108, radar 112, radar 114, radar 116, and radar 118. The determining of the transmission parameter values may be based on two approaches.

The first approach may be based on completely random selection of transmission parameter values for these parameters. In particular embodiments, the computing system may randomly determine one or more transmission parameter values of the one or more parameters. Each of the determined transmission parameter values of the one or more parameters may be within the respective value range of each of the one or more parameters. In particular embodiments, each transmission parameter value may be a range instead of a point and such range is within the value range of the parameter. As an example and not by way of limitation, if the value range of frequency is 76 GHz to 81 GHz, the computing system may randomly determine 79 GHz, 79.2 GHz, or 79.35 GHz as the transmission parameter value for frequency. As another example and not by way of limitation, if the value range of frequency is 21 GHz to 26 GHz, the computing system may randomly determine any value between 22 GHz and 25 GHz can be used as the transmission parameter value for frequency by the radar. As another example and not by way of limitation, if the value range of frequency is 21 GHz to 26 GHz, the computing system may randomly determine any value between 24 GHz and 24.25 GHz can be used as the transmission parameter value for frequency by the radar. As another example and not by way of limitation, if one of the parameters is polarization which is based on spatial multiplicity of 10 degrees within a 180-degree span, the parameter value for polarization may be one of the 18 points generated by dividing 180 by 10. Continuing with the example in FIG. 2, once the computing system determines the value or value range for frequency 202, time 204, and polarization 206, respectively, a sub radar signal space 208 may be formed. As shown in FIG. 2, the sub radar signal space 208 is within the radar signal space 200.

In particular embodiments, randomly determining the one or more transmission parameter values of the one or more parameters may be based on environment modeling. Environmental modeling is the creation and use of mathematical models of the environment. Environmental modeling may be used purely for research purposes and improved understanding of environmental systems, or for providing an interdisciplinary analysis that can inform decision making and policy. In particular embodiments, randomly determining the one or more transmission parameter values of the one or more parameters may be based on a collision probability model. A collision probability model may assess the probability of vehicles colliding, presenting a new approach for the geometrical probability of collision estimation on the basis of navigation experience, traffic data and generalized vehicle dynamics. A collision probability model may use advanced statistical and optimization methods such as Monte Carlo and genetic algorithms. In particular embodiments, the computing system may then configure the radar with the determined one or more transmission parameter values.

Once the radar is configured with the determined transmission parameter values, the radar may use them for the radar signal emitted from itself. As a result, the computing system may send and receive radar signal of the radar using the determined transmission parameter values. The radar signal may be associated with the one or more transmission parameter values. However, it may still be possible that the radar signal is in conflict with other radar signals in the area because they use the same transmission parameter values for the parameters. Under such situation, the computing system may determine that a signal quality of the radar signal is below a threshold level. In particular embodiments, determining that the signal quality of the radar signal is below the threshold level may be based on one or more of an indication of signal interference associated with the radar signal or a signal-to-noise ratio of the radar signal being below a threshold number. In response to the determination, the computing system may again randomly determine one or more updated transmission parameter values of the one or more parameters. Correspondingly, the one or more updated transmission parameter values may be used for the one or more parameters for the radar. The computing system may continue re-determining the transmission parameter values until the signal quality of the radar signal associated with the radar is not below the threshold level anymore.

Figure 3:
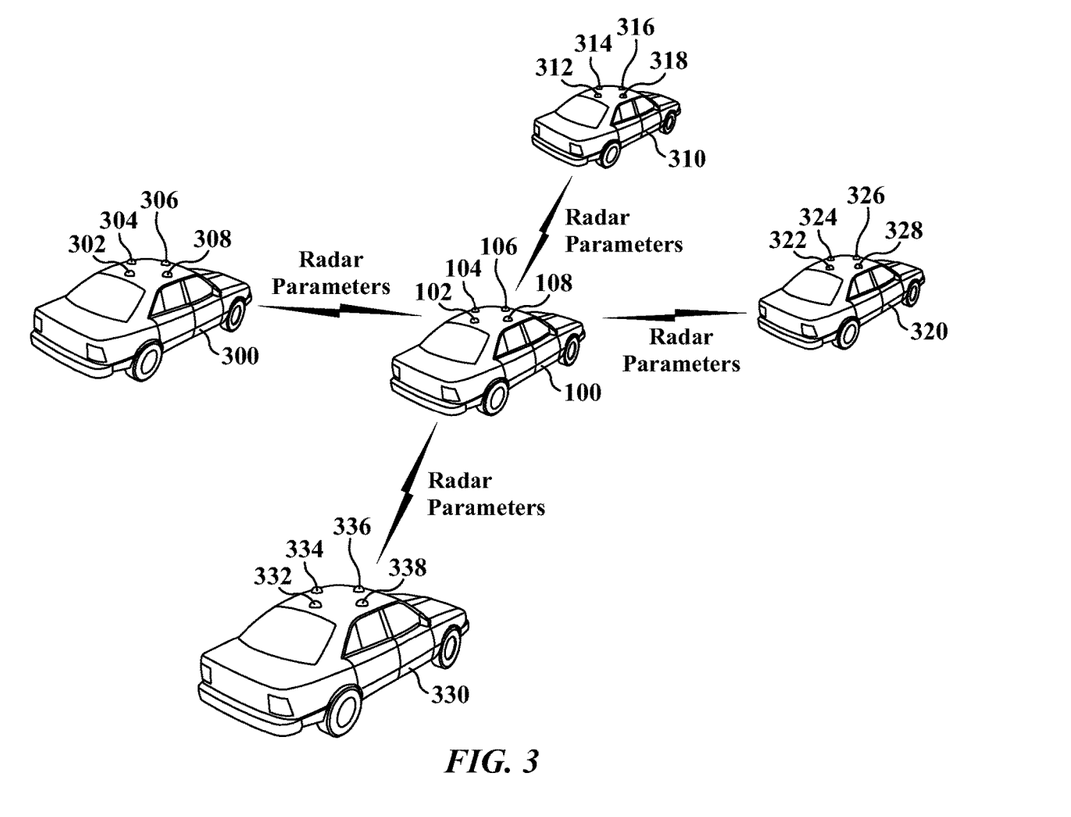
FIG. 3 illustrates an example scenario where there are multiple vehicles, each having multiple radars.

FIG. 3 illustrates an example scenario where there are multiple vehicles, each having multiple radars. The second approach may be based on semi-random selection of transmission parameter values for these parameters, which requires the computing system to check the configurations of other radars located on the vehicle 100 and/or other vehicles. As an example and not by way of limitation, any one of radar 102, radar 104, radar 106, and radar 108 on vehicle 100 displayed in FIG. 3 may request the computing system to configure its radar signal. It can be seen in FIG. 3 that there are four other vehicles, i.e., vehicle 300, vehicle 310, vehicle 320, and vehicle 330 around vehicle 100. Vehicle 100 may have wireless communication with all the other four vehicles. In addition, each of these other vehicles may have its own radars. For example, radar 302, radar 304, radar 306, and radar 308 may be installed on vehicle 300. As a result, to determine the transmission parameter values of the parameters for a radar installed on vehicle 100, e.g., radar 102, the computing system may check the configurations of all the other radars presented in FIG. 3. In this scenario, these other radars may be referred as environmental radars. Environmental radars may indicate that these radars are near a radar operated by the computing system and are causing interference to the radar. As displayed in FIG. 3, the radars on vehicle 100 may communicate with other environmental radars about their radar signal parameters via the wireless communications.

In particular embodiments, the computing system may identify one or more environmental radars associated with the radar. In one scenario, the radar and one or more of the one or more environmental radars may be located on the vehicle 100. Continuing with the example in FIG. 3, the radar may be radar 102 and the environmental radars may be radar 104, radar 106, and radar 108. In another scenario, the radar may be located on the vehicle 100 and the one or more environmental radars may be located on one or more environmental vehicles. Environmental vehicles may indicate the vehicle where the environmental radars are installed on. Continuing with the example in FIG. 3, the radar may be radar 102 and the environmental radars may be radars on vehicle 300, radars on vehicle 310, radars on vehicle 320, radars on vehicle 330, or any combination thereof.

Depending on the configuration of the computing system, identifying the environmental radars may be based on different approaches. In particular embodiments, the computing system may be located on the vehicle 100. For this scenario, there may be wireless communication links between the vehicle 100 and each of the environmental vehicles, which is indicated in FIG. 3 as an example. The computing system may communication with the computing systems associated with the environmental vehicles. Correspondingly, the identifying of the one or more environmental radars may comprise the following steps. The computing system may first send a broadcast signal and then receive one or more responses to the broadcast signal from one or more environmental vehicles associated with the one or more environmental radars. Continuing with the example in FIG. 3, the computing system associated with vehicle 100 may send a broadcast signal and then receive responses from vehicle 300, vehicle 310, vehicle 320, vehicle 330, or any combination thereof. The broadcast signal may be from any of the radars on vehicle 100. The responses may be from any of the radars on vehicle 300, vehicle 310, vehicle 320, vehicle 330, or any combination thereof.

Figure 4:
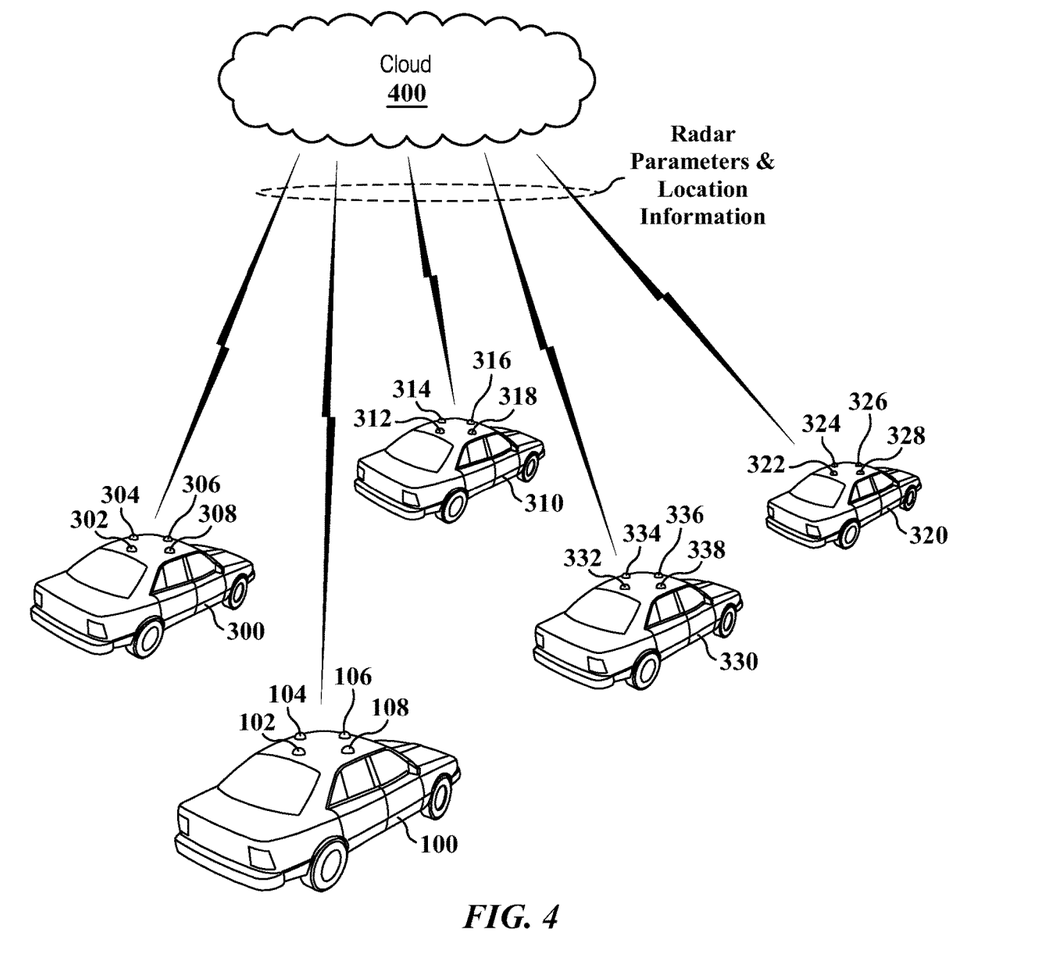
FIG. 4 illustrates an example scenario where there are multiple vehicles associated with a cloud computing platform, each vehicle having multiple radars.

FIG. 4 illustrates an example scenario where there are multiple vehicles associated with a cloud computing platform 400, each vehicle having multiple radars. In particular embodiments, the computing system may be part of a cloud computing platform 400. The computing system may communicate with the cloud computing platform 400. The cloud computing platform 400 may operate vehicle controls of a plurality of vehicles. As an example and not by way of limitation, FIG. 4 shows that the computing system associated with vehicle 100 may communicate with the cloud computing platform 400. In addition, the cloud computing platform 400 may operate vehicle controls of vehicle 300, vehicle 310, vehicle 320, and vehicle 330. Each vehicle displayed in FIG. 4 may have multiple radars installed on it. Under such scenario, the identifying of the one or more environmental radars may comprise the following steps. The computing system may first receive location information associated with the radar and a plurality of environmental radars. In particular embodiments, the location information may comprise one or more of GPS signals, information from cell towers, information from Internet Protocol (IP) address, information from radio frequency identification (RFID), information from Wi-Fi positioning system, information from device fingerprint, information from canvas fingerprinting, data collected by software development kit (SDK) codes installed on devices, bitstream data collected from the ad servers, or data collected by beacons. In particular embodiments, the location information may be determined by a variety of coordinate systems and different methods of localization. As an example and not by way of limitation, the location information may be determined by radio frequency (RF) location methods. As another example and not by way of limitation, the location information may be determined by triangulating information from cell towers. Continuing with the example in FIG. 4, the radar may be radar 102 on vehicle 100 and the environmental radars may be all the radars on vehicle 300. Correspondingly, the computing system of vehicle 100 may inquire the cloud computing platform 400 and the cloud computing platform 400 may then send back the location information associated with the radar and the environmental radars. As another example and not by way of limitation, the computing system may directly get the location information associated with the radar (e.g., the computing system has a GPS receiver integrated with the system) and inquire the cloud computing platform 400 about the location information associated with the environmental radars. The computing system may then determine, based on the location information, that the one or more environmental radars are within a threshold distance of the radar. For example, the computing system may determine that radar 302, 304, 306, and 308 are within 20 feet (i.e., the threshold distance) from radar 102. In particular embodiments, the computing system may then select the one or more environmental radars from the plurality of environmental radars.

In particular embodiments, the computing system may further identify, for each of one or more environmental radars, one or more parameter values associated with a radar signal of the environmental radar. As an example and not by way of limitation, the computing system may inquire the computing systems associated with the environmental radars or the cloud computing platform 400 for the configurations of these environmental radars. Based on the inquiry, the computing system may further identify the parameter values of the parameters associated with the environmental radars. Continuing with the example in FIG. 4, the computing system may identify parameter values of the parameters associated with radar 302, radar 304, radar 306, and radar 308 and then send them to the radar 102.

Figure 5:
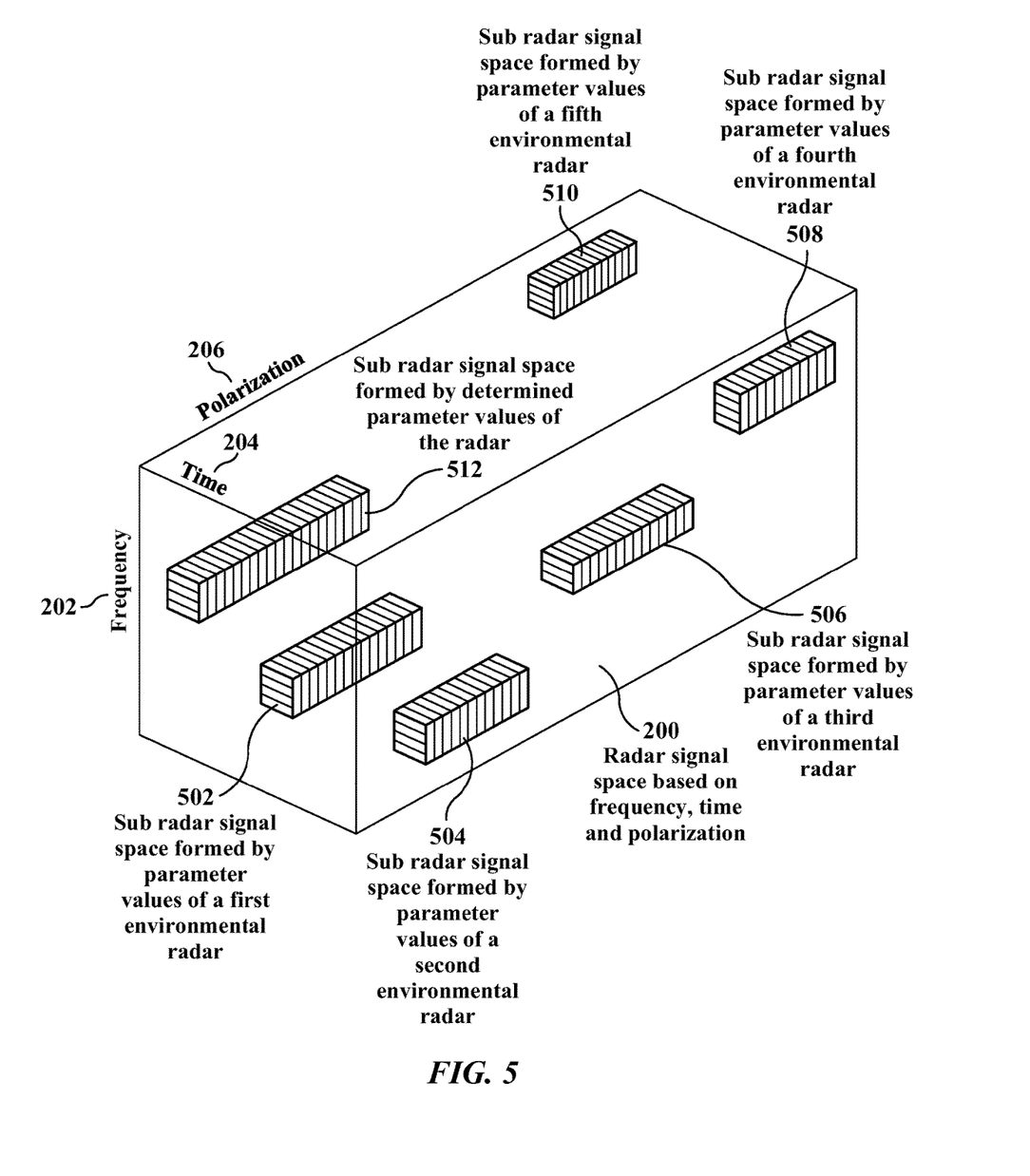
FIG. 5 illustrates an example visualization of determining transmission parameter values for a radar in a semi-random fashion.

FIG. 5 illustrates an example visualization of determining transmission parameter values for a radar in a semi-random fashion. In particular embodiments, the computing system may further determine one or more transmission parameter values for the radar. A combination of the one or more transmission parameter values is different from a combination of the one or more parameter values of each of the one or more environmental radars. As an example and not by way of limitation, FIG. 5 shows that a combination of the parameter values of a first environmental radar may take a subspace 502 in the radar signal space 200, a combination of the parameter values of a second environmental radar may take a subspace 504 in the radar signal space 200, a combination of the parameter values of a third environmental radar may take a subspace 506 in the radar signal space 200, a combination of the parameter values of a fourth environmental radar may take a subspace 508 in the radar signal space 200, and a combination of the parameter values of a fifth environmental radar may take a subspace 510 in the radar signal space 200. Correspondingly, the computing system may determine a different combination of the one or more transmission parameter values for the radar. Such combination may be reflected by the subspace 512 in the radar signal space 200. It can be seen that the subspaces associated with the environmental radars and the radar are all of different sizes and shapes. This indicates that the parameter values of each environmental radar and of the radar all have different ranges. Suppose the radar signal space 200 is formed based on frequency range of 76 GHz to 81 GHz, time range of 10 milliseconds (ms) to 100 milliseconds (ms), and polarization range of 1 to 18, respectively. Accordingly, the following may be example parameter values for each environmental radar. For example, the frequency, time, and polarization values for the first environmental radar may be 77.6 GHz to 78.32 GHz, 62 ms to 79 ms, and 1 to 5, respectively; the frequency, time, and polarization values for the second environmental radar may be 76.5 GHz to 77.4 GHz, 88 ms to 96 ms, and 2 to 4, respectively; the frequency, time, and polarization values for the third environmental radar may be 78 GHz to 78.6 GHz, 60 ms to 82 ms, and 6 to 11, respectively; the frequency, time, and polarization values for the fourth environmental radar may be 79.8 GHz to 80.8 GHz, 62 ms to 77 ms, and 13 to 17, respectively; the frequency, time, and polarization values for the fifth environmental radar may be 80 GHz to 80.8 GHz, 11 ms to 22 ms, and 12 to 16, respectively. According to how these sub radar signal spaces associated with the environmental radars occupy the radar signal space 200, the computing system may then determine the transmission parameter values for the radar in the semi-random fashion. The computing system may determine the transmission parameter values so that the signal of the radar won't be interfered by signals from the environmental radars. In particular embodiments, the determining of the one or more transmission parameter values of the radar may comprise the following steps. The computing system may first generate the one or more transmission parameter values randomly. Then the computing system may determine that the randomly-generated one or more transmission parameter values are different from the one or more parameter values of each of the one or more environmental radars. As an example and not by way of limitation, if the computing system determines that 77 GHz of the frequency parameter and 20 milliseconds of the time parameter are already taken by a second radar, the computing system may configure the radar to use any frequency between 76 GHz and 81 GHz but 77 GHz and any time between 10 milliseconds and 100 milliseconds to transmit its radar signal. In this case, even if the radar uses 20 milliseconds as its time parameter, the combination would still be different from the combination associated with the environmental radar (e.g., 79 GHz & 20 milliseconds v.s. 77 GHz & 20 milliseconds). Continuing with the example in FIG. 5, the computing system may determine that the radar may use 78.8 GHz to 79.4 GHz in frequency, 20 ms to 37 ms in time, and 1 to 5 in polarization, based on the parameter values of the environmental radars. As can be seen, the sub radar signal space 512 is separate from all the other sub radar signal spaces associated with the environmental radars, which indicates that there won't be interference. In particular embodiments, the computing system may further configure the radar with the determined one or more transmission parameter values.

Figure 6:
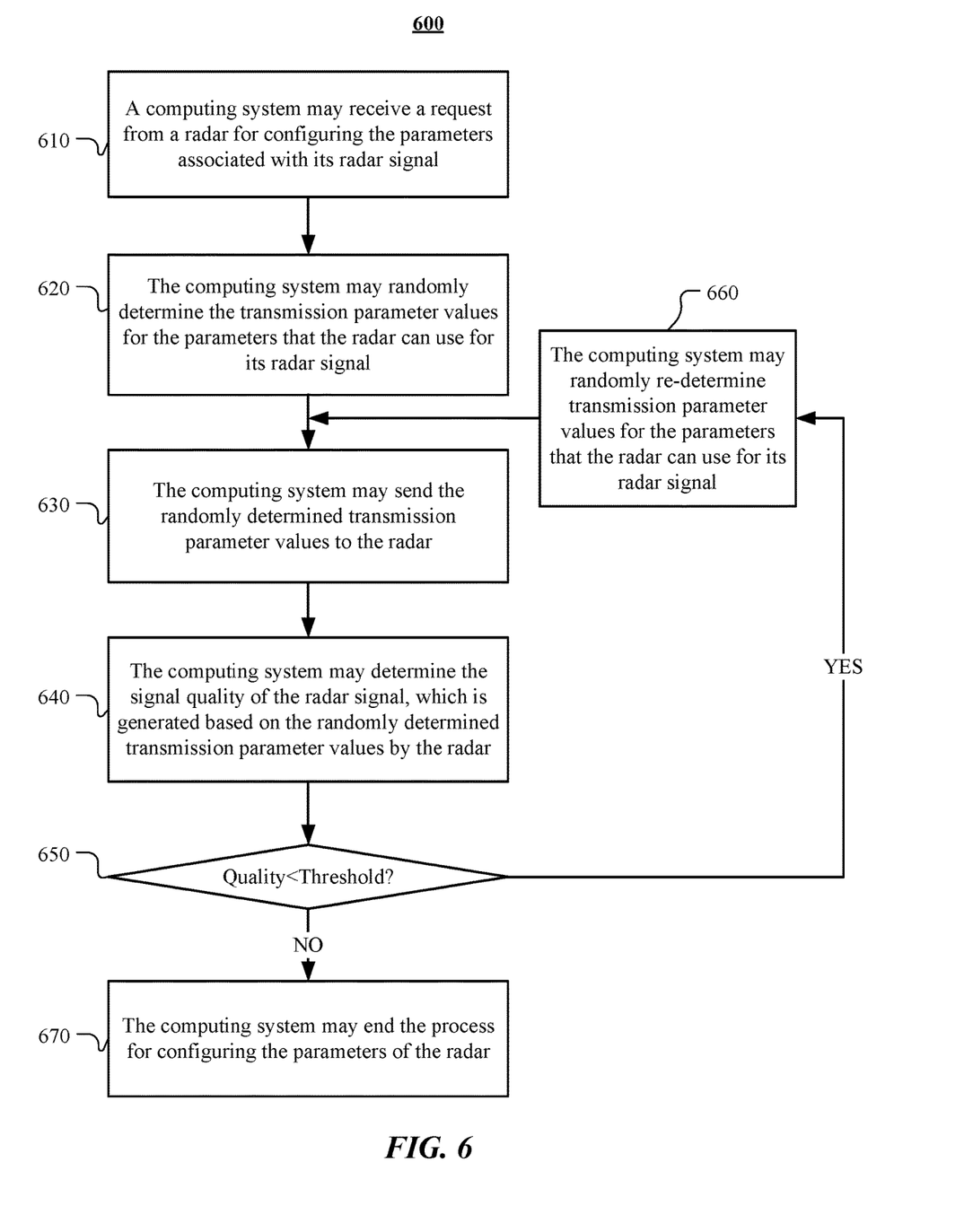
FIG. 6 illustrates an example of a method for randomly configuring parameters for a radar.

FIG. 6 illustrates an example method 600 for randomly configuring parameters for a radar. The method may begin at step 610, where a computing system may receive a request from a radar for configuring the parameters associated with its radar signal. At step 620, the computing system may randomly determine the transmission parameter values for the parameters that the radar can use for its radar signal. At step 630, the computing system may send the randomly determined transmission parameter values to the radar. At step 640, the computing system may determine the signal quality of the radar signal, which is generated based on the randomly determined transmission parameter values by the radar. At step 650, the computing system may determine if the signal quality of the radar signal is below a threshold level. If the signal quality is below the threshold level, the computing system may proceed to step 660, where the computing system may randomly re-determine transmission parameter values for the parameters that the radar can use for its radar signal. If the signal quality is not below the threshold level, the computing system may proceed to step 670, where the computing system may end the process for configuring the parameters of the radar. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for randomly configuring parameters for a radar including the particular steps of the method of FIG. 6, this disclosure contemplates any suitable method for randomly configuring parameters for a radar including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
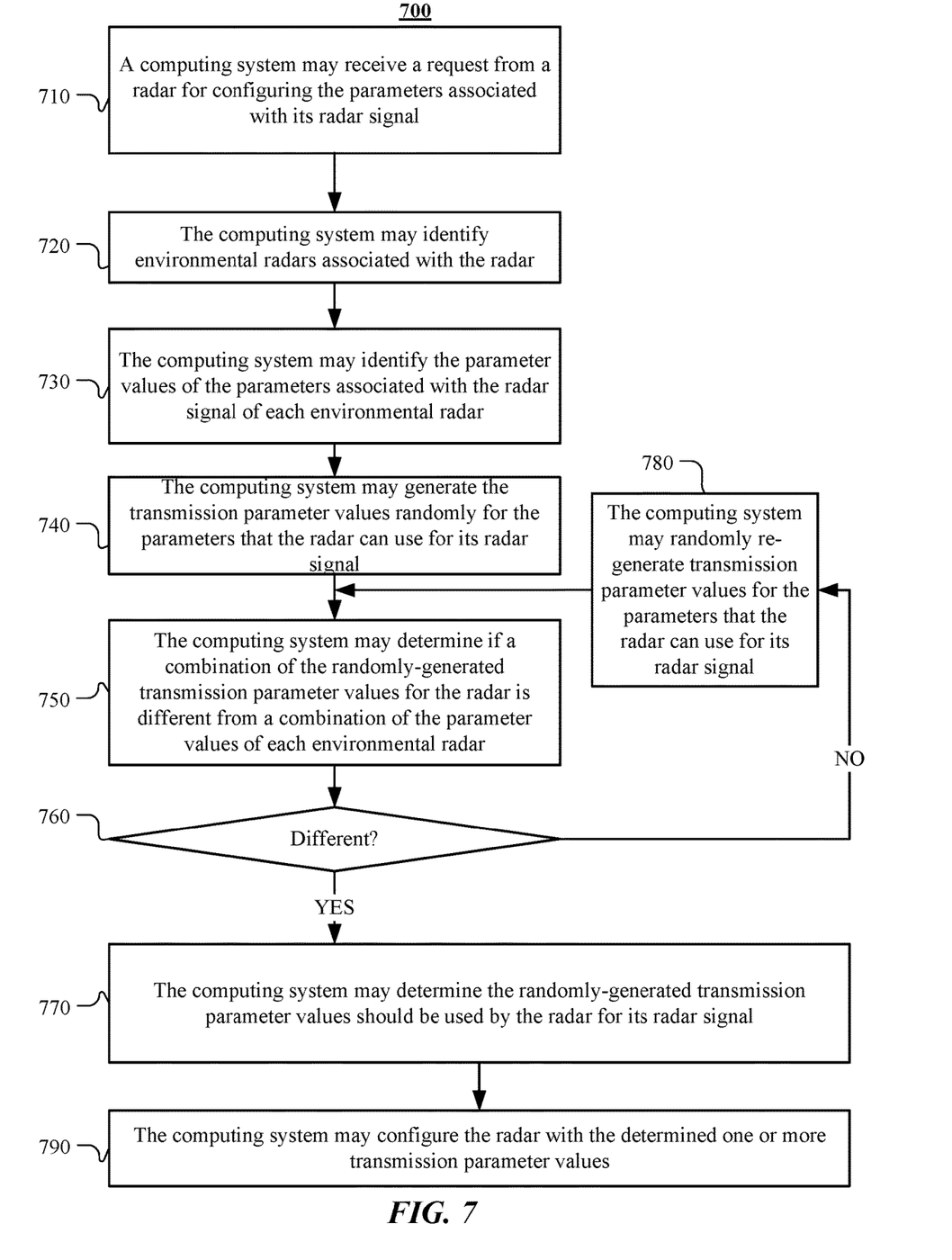
FIG. 7 illustrates an example method for semi-randomly configuring parameters for a radar.

FIG. 7 illustrates an example method 700 for semi-randomly configuring parameters for a radar. The method may begin at step 710, where a computing system may receive a request from a radar for configuring the parameters associated with its radar signal. At step 720, the computing system may identify environmental radars associated with the radar. At step 730, the computing system may identify the parameter values of the parameters associated with the radar signal of each environmental radar. At step 740, the computing system may generate the transmission parameter values randomly for the parameters that the radar can use for its radar signal. At step 750, the computing system may determine if a combination of the randomly-generated transmission parameter values for the radar is different from a combination of the parameter values of each environmental radar. Step 760 may be a decision point of whether they are different. If they are different, the computing system may proceed to step 770, where the computing system may determine the randomly-generated transmission parameter values should be used by the radar for its radar signal. If the decision point indicates they are not different, the computing system may proceed to step 780, where the computing system may randomly re-generate transmission parameter values for the parameters that the radar can use for its radar signal. At step 790, the computing system may configure the radar with the determined one or more transmission parameter values. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for semi-randomly configuring parameters for a radar including the particular steps of the method of FIG. 7, this disclosure contemplates any suitable method for semi-randomly configuring parameters for a radar including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
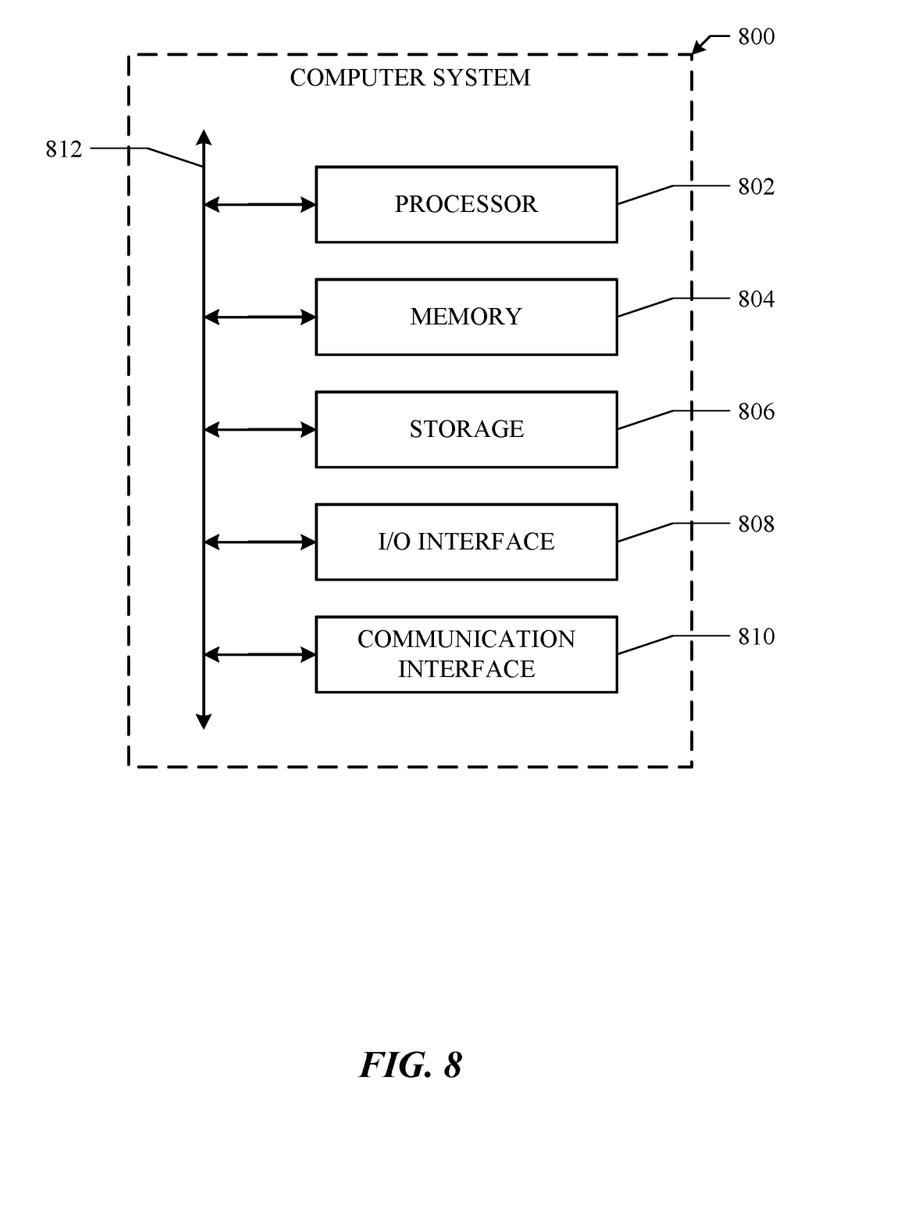
FIG. 8 illustrates an example of a computing system.

FIG. 8 illustrates an example computer system 800. In particular embodiments, one or more computer systems 800 perform one or more steps of one or more methods described or illustrated herein. In particular embodiments, one or more computer systems 800 provide the functionalities described or illustrated herein. In particular embodiments, software running on one or more computer systems 800 performs one or more steps of one or more methods described or illustrated herein or provides the functionalities described or illustrated herein. Particular embodiments include one or more portions of one or more computer systems 800. Herein, a reference to a computer system may encompass a computing device, and vice versa, where appropriate. Moreover, a reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 that are to be operated on by computer instructions; the results of previous instructions executed by processor 802 that are accessible to subsequent instructions or for writing to memory 804 or storage 806; or any other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs), be a multi-core processor, or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described in further detail below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system associated with a vehicle having a vehicle radar:
   identifying, for one or more environmental radars, parameter values associated with a radar signal of the environmental radars;
   identifying the environmental radars according to communications from one or more environmental vehicles associated with the environmental radars by receiving one or more responses from the one or more environmental vehicles to a broadcast signal, the one or more responses including the parameter values;
   determining one or more transmission values for the vehicle radar, including randomly generating a combination of the transmission values that are different from a combination of the parameter values of the environmental radars according to, at least in part, a collision probability model that assesses a probability of collisions between the vehicle and the one or more environmental vehicles associated with the one or more environmental radars, the collision probability model using navigation experience, traffic data, and vehicle dynamics to assess the probability of collisions from which determining the transmission values is based; and
   configuring the vehicle radar with the transmission values.

2. The method of claim 1, wherein the transmission values correspond to time, frequency, polarization, pulse width, or pulse repetition frequency.

3. The method of claim 2, wherein the transmission values have one or more value ranges, respectively.

4. The method of claim 1, wherein determining the transmission values comprises:
   generating the parameter values randomly according to, at least in part, a collision probability model that assesses a probability of collisions; and
   determining that the transmission values are different from the parameter values of the environmental radars.

5. The method of claim 1, wherein the identifying of the environmental radars comprises:
   sending the broadcast signal.

6. The method of claim 1, wherein the vehicle radar and the one or more environmental radars are located on the vehicle.

7. The method of claim 1, wherein the one or more environmental radars are located on one or more environmental vehicles that are distinct from the vehicle.

8. The method of claim 1, wherein the computing system is part of a cloud computing platform.

9. The method of claim 8, further comprising identifying the one or more environmental radars, wherein the identifying comprises:
   receiving location information associated with the vehicle radar and a plurality of environmental radars;
   determining, based on the location information, that the one or more environmental radars are within a threshold distance of the vehicle radar; and
   selecting the one or more environmental radars from the plurality of environmental radars.

10. A system comprising:
    one or more processors and one or more computer-readable non-transitory storage media coupled to one or more of the processors, the one or more computer-readable non-transitory storage media comprising instructions operable when executed by one or more of the processors to cause the system to:
    identify, for one or more environmental radars, parameter values associated with a radar signal of the environmental radars;
    identify the environmental radars according to communications from one or more environmental vehicles associated with the environmental radars by receiving one or more responses from the one or more environmental vehicles to a broadcast signal, the one or more responses including the parameter values;
    determine one or more transmission values for a vehicle radar of a vehicle, wherein the instructions to determine the transmission values includes instructions to randomly generate a combination of the one or more transmission values that are different from a combination of the parameter values of the one or more environmental radars and according to, at least in part, a collision probability model that assesses a probability of collisions between the vehicle and the one or more environmental vehicles associated with the one or more environmental radars, the collision probability model using navigation experience, traffic data, and vehicle dynamics to assess the probability of collisions from which determining the transmission values is based; and configure the vehicle radar with the transmission values.

11. The system of claim 10, wherein the one or more transmission values correspond to time, frequency, polarization, pulse width, or pulse repetition frequency.

12. The system of claim 10, wherein the instructions to determine the one or more transmission values include instructions to:

generate the parameter values randomly according to, at least in part, a collision probability model that assesses a probability of collisions; and determine that the transmission values are different from the parameter values of the one or more environmental radars.

13. The system of claim 10, wherein the identifying of the one or more environmental radars comprises:

sending the broadcast signal.

14. One or more computer-readable non-transitory storage media embodying software that is operable when executed to cause one or more processors to perform operations comprising:

identifying, for one or more environmental radars, one or more parameter values associated with a radar signal of the environmental radars;

identifying the environmental radars according to communications from one or more environmental vehicles associated with the environmental radars by receiving one or more responses from the one or more environmental vehicles to a broadcast signal, the one or more responses including the parameter values;

determining one or more transmission values for a vehicle radar of a vehicle, wherein determining the transmission values includes randomly generating a combination of the one or more transmission values that are different from a combination of the one or more parameter values of the one or more environmental radars and according to, at least in part, a collision probability model that assesses a probability of collisions between the vehicle and the one or more environmental vehicles associated with the one or more environmental radars, the collision probability model using navigation experience, traffic data, and vehicle dynamics to assess the probability of collisions from which determining the transmission values is based; and configuring the vehicle radar with the transmission values.

15. The media of claim 14, wherein the one or more transmission values correspond to time, frequency, polarization, pulse width, or pulse repetition frequency.

16. The media of claim 14, wherein the determining of the one or more transmission values comprises:

generating the one or more transmission values randomly according to, at least in part, a collision probability model that assesses the probability of collisions; and determining that the transmission values are different from the one or more parameter values of the one or more environmental radars.

17. The media of claim 14, wherein the identifying of the one or more environmental radars comprises:

sending the broadcast signal.

\* \* \* \* \*